(12) United States Patent
Shohara et al.

(10) Patent No.: US 6,804,503 B2
(45) Date of Patent: Oct. 12, 2004

(54) COMMUNICATION DEVICE WITH A SELF-CALIBRATING SLEEP TIMER

(75) Inventors: Aki Shohara, Sunnyvale, CA (US); Emilia Vailun Lei, Union City, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/272,439

(22) Filed: Oct. 15, 2002

(65) Prior Publication Data

US 2003/0119503 A1 Jun. 26, 2003

Related U.S. Application Data

(63) Continuation of application No. 09/302,447, filed on Apr. 30, 1999, now Pat. No. 6,473,607.
(60) Provisional application No. 60/087,402, filed on Jun. 1, 1998.

(51) Int. Cl.[7] .................................................. H04B 1/16
(52) U.S. Cl. .................... 455/343.4; 455/208; 455/265; 455/574; 340/7.32; 375/354
(58) Field of Search .................. 455/208, 343.1–343.4, 455/255, 257, 258, 259, 574, 265; 340/7.32, 7.38; 370/311; 375/354

(56) References Cited

U.S. PATENT DOCUMENTS 5,428,820 A * 6/1995 Okada et al. ................ 455/343
5,815,043 A * 9/1998 Chow et al. ................... 331/57
5,994,970 A * 11/1999 Cole et al. ..................... 331/68
5,995,820 A * 11/1999 Young et al. ............. 455/343.1
6,473,607 B1 * 10/2002 Shohara et al. ............. 455/343

FOREIGN PATENT DOCUMENTS

EP 0726508 * 8/1996 ............ G04G/7/02

* cited by examiner

Primary Examiner—Lee Nguyen
(74) Attorney, Agent, or Firm—Bruce Garlick

(57) ABSTRACT

The present invention provides for a system for operating a communication device (20) for reception of scheduled intermittent information messages (22) with a dual mode timer (70) that extends battery life. A controller (50) schedules the timer (70) to power down all idle components of the device (20) between message receptions in a power saving sleep mode to conserve battery power. During active mode when the device is fully active in reception of messages, the timer (70) uses a reference oscillator (90) with a relatively high frequency to support digital processing by the receiver (26). During sleep mode when only the timer is powered on, a much lower frequency sleep oscillator (96) is used to maintain the lowest possible level of power consumption within the timer itself. The timer (70) has provision for automatic temperature calibration to compensate for timing inaccuracies inherent to the low-power low-frequency crystal oscillator (96) used for the sleep mode. The resultant improvement in timer accuracy during sleep mode eliminates the need for an initial reacquisition period following wake up in active mode, thereby reducing battery drain in active mode as well.

14 Claims, 6 Drawing Sheets

SYSTEM TIME —108

| REFERENCE COUNT | FRAME COUNT | MULTIFRAME COUNT |
|---|---|---|

EVENT-TIME TABLE — 110

| EVENT NO. | REFERENCE COUNT | FRAME COUNT | MULTIFRAME COUNT |
|---|---|---|---|
| 1 | | | |
| 2 | | | |
| * | | | |
| * | | | |
| N | | | |

FIG. 3B

EVENT-COMMAND TABLE — 112

| EVENT NO. | COMMAND |
|---|---|
| 1 | |
| 2 | |
| * | |
| * | |
| N | |

FIG. 3C

EPOCHS:

REFERENCE COUNTER CLOCK 72 (REFERENCE OSCILLATOR)
REFERENCE COUNTER FRAME 78
SLEEP COUNTER CLOCK 86 (SLEEP OSCILLATOR)
SLEEP COUNTER FRAME 102
FRAME COUNTER CLOCK 79

COMMUNICATION DEVICE WITH A SELF-CALIBRATING SLEEP TIMER

The present application is a continuation of U.S. patent application Ser. No. 09/302,447, filed Apr. 30, 1999, now issued as U.S. Pat. No. 6,473,607 B1, which claims priority pursuant to 35 U.S.C. Sec. 119(e) to U.S. Provisional Application Ser. No. 60/087,402, filed Jun. 1, 1998, both of which are hereby incorporated herein by reference in their entirety.

FIELD OF THE INVENTION

This invention relates to the methods and devices to reduce power consumption in on-off communication devices for intermittent message reception.

PRIOR ART

The present invention pertains to the class of digital communication devices which receive messages according to an intermittent schedule known to the receiver and where power saving is important. Examples of devices belonging to this class are pagers, and battery-operated cellular phones operating in standby mode awaiting a page from a base station announcing an incoming call. A cellular phone may also receive short user information messages in the same way that pagers do.

During reception of the message in an active mode, the communication device is fully active and a relatively high timer clock frequency is required to support the digital processing of the device. Between scheduled message receptions the device typically enters a sleep mode during the inactive periods between message receptions. During sleep mode virtually all components of the communication device except for the system timer are powered down to minimize power consumption. The system timer is needed to maintain system time and terminate sleep mode for the next scheduled message reception. Because sleep mode typically has a very high duty cycle, it is important that the sleep timer itself have very low power consumption during sleep mode. Accordingly, prior art recognizes the virtue of low power timers for sleep mode. For example, U.S. Pat. No. 4,860,005-DeLuca et. al. (1989) describes the use of a real-time sleep timer programmed to turn on the receiver and a higher frequency timer to process the scheduled message. The oscillator for a real-time clock typically utilizes a low frequency 32.768 kilohertz crystal termed a watch crystal. Owing to the low frequency of the watch crystal oscillator timer consumption during sleep mode can be as low as 5 microamperes with present day integrated circuit technology. In contrast a separate, much higher frequency, reference oscillator is needed for the timer during active mode to support high speed timing digital processing for message reception. Typical battery consumption for present day reference oscillators in cellular phones is approximately 2 milliamperes.

A recent patent, U.S. Pat. No. 5,613,235, Kivari et al., acknowledges the importance of the synchronization factor in design for power savings and advances the state of art by an invention that is relevant specifically to first generation cellular phones as known in the art. First generation cellular phones are the analog AMPS standard and digital derivatives thereof. Kivari et al. provide for an apparatus for compensation of synchronization error by method of oscillator calibration. That is, the sleep mode oscillator is calibrated relative to the higher frequency accurate active mode oscillator to estimate the frequency error of the sleep oscillator. The cumulative sleep mode timing error is then removed at the beginning of active mode based on the estimated frequency error. The general methodology of using oscillator calibration to compensate the shortcomings of in inaccurate timer is however not new to the Kivari patent and has been applied in other applications, as can be seen, for example, in the reference, "Low Power Timekeeping", M. Bloch, M. Meirs, J. Ho, J. R. Vig, and S. S. Schodowski, 1989 IEEE International Frequency Control Symposium.

While Kivari et al. assert the power saving advantages in the use of a low-frequency oscillator for the sleep timer, they say nothing about the attendant drawbacks, specifically inherently poor frequency accuracy or stability. In general low frequency oscillators have a larger frequency error relative to higher frequency reference oscillators and consequently a large system timer error accrues during sleep mode. When the communication device switches to active mode to receive a scheduled message the accumulated sleep mode timing error represents synchronization error during message reception. When synchronization error exceeds a predetermined amount, the receiver is unable to demodulate the burst message and loss of synchronization is said to occur. Under condition of loss of synchronization, a process of reacquisition which involves the processing of extraneous transmissions from the message sources such as synchronization bursts is required before reception of the desired message is possible. Allowance for the overhead of reacquisition at the beginning of active mode requires that the receiver transition out of the low-power sleep mode and into the high-power active mode sooner. In this way sleep mode timing inaccuracy imposes a power consumption penalty in active mode. Generally, the problem of maintaining synchronization becomes more difficult as the symbol rate increases. This is because for a [for a] given loss-of-synchronization criterion expressed in message symbols the corresponding timing accuracy needed becomes smaller as the data rate increases. A recent worldwide trend toward higher data rates for communication devices such as cellular phones makes the loss of synchronization by the sleep timer an increasingly important factor with respect to power savings.

The invention of Kivari et al. while adequate specifically for first generation cellular phones does not generally address the synchronization problem for the higher data rates of second generation cellular phones and beyond. Second generation cellular phones as known in the art are the present day phones as defined by standards bodies from the ground up as purely digital phones and the GSM worldwide standard is an example. Third generation phones as known in the art are now being defined by international standards bodies and are characterized by bandwidths that are much wider than is needed for voice communications to address future data communication needs. Shortcomings of the prior art of Kivari et. al. for current second generation phones and soon-to-appear third generation phones are as follows: (1) there is no provision for normal temperature changes and related oscillator recalibration management; (2) there is no provision for application of calibration compensation to the sleep mode timer during sleep mode; and (3) the sleep mode timer structure requires that the higher frequency reference oscillator be an integer multiple of the low frequency sleep oscillator.

The prior art does not maintain system timing accuracy during sleep mode. To see the shortcomings of prior art for current second generation cellular phones by way of numerical example, the GSM (Group Speciale Mobile) worldwide standard which has a symbol rate of 272 KHz and a maximum paging interval of 2.1 seconds. A typical GSM receiver will lose synchronization, i.e., be unable to demodulate a message burst, if the synchronization error exceeds four symbols. Accumulation of timing error less than four-symbols in the sleep or paging interval requires a sleep timer frequency error of better than 7 ppm (parts per million). In a practical design half that error or 3.5 ppm would be budgeted for the low-frequency oscillator to allow for other sources of synchronization error such as residual time tracking error at the time of the previous message. A typical low frequency oscillator such as a real time clock oscillator has a temperature dependent frequency excursion of approximately 84 ppm over the typical operating range of +/−35 degrees C. about room temperature That is, if the temperature of the cellular phone ranged from minimum to maximum operating temperature with a requirement of better than 3.5 ppm accuracy for the sleep timer, the sleep timer would need to be re-calibrated 84/3.5 or 24 times. Recalibration of the sleep timer requires continual active mode operation of the high-frequency high power consumption oscillator during calibration and typical calibration time for the GSM example is approximately 4 to 8 seconds. During standby mode for GSM the paging message bursts are only 4.6 milliseconds in duration, and the duty cycle for paging messages is as low as 0.0011 so that calibration incurs overhead in power consumption that should only be performed when necessary.

The preceding numerical example teaches the importance of management of the calibration of the sleep timer for power conservation. On the one hand calibration must be performed when oscillator frequency error becomes excessive or demodulation of the message will fail. But on the other hand unnecessary calibration incurs power waste by prolonging active mode just for calibration. The determination of when to calibrate in an operational environment when normal temperature changes can invalidate a prior oscillator calibration is critical to the successful application of the calibration methodology for compensating sleep oscillator frequency error. The invention of Kivari et al. does not address the critical issue of calibration management for a changing temperature environment.

The basic timer structure in the invention of Kivari et. al. has the drawback that compensation for sleep oscillator timing error accumulated during sleep mode cannot be applied until active mode because the reference oscillator must be powered up to apply the correction. A more useful sleep timer structure is one in which the sleep timer is continually compensated to account for the estimated frequency error of the sleep oscillator from oscillator calibration. In this way system time can be maintained accurately during sleep mode and used for accurate scheduling of power management even during sleep mode and for terminating sleep mode. For example, active mode cannot begin until the high-frequency oscillator for the active mode timer has been powered up in advance for settling time. The receiver synthesizer may also be powered up in advance of start of active mode to allow for settling time. Without such accurate scheduling the powering up of components in preparation for active mode must be started earlier to compensate for unknown sleep timer error accumulation.

OBJECTIVES AND ADVANTAGES

Accordingly, a principal object of the present invention is a sleep timer that uses a very low frequency oscillator which incurs very low power consumption during sleep mode.

Another object of the present invention is to overcome the inherent time inaccuracy attendant with low frequency clocks.

A further object of the invention is to provide an automatic calibration algorithm which uses oscillator calibration to estimate the frequency error.

Still another object of the invention is to continually compensate in the sleep timer so that system time is accurately maintained through sleep mode.

Yet another object of the invention is to maintain synchronism of system time with received messages so that in active mode reacquisition and associated penalty in power consumption is not incurred.

A particular advantage of the present invention is that it provides for management of re-calibration wherein the occurrence of significant change in frequency error due to temperature change that could lead to loss of synchronization is sensed and recalibration initiated. In this way re-calibration which itself incurs power drain is invoked only when warranted. The prior art does not address this need.

The invention also provides an alternative method of compensation for temperature changes wherein the initial calibration as described above is used as an initial condition for the compensation. Thereafter, the compensation term is updated by a tracking loop with each message reception, where the update is feedback from an estimate of the low frequency oscillator frequency error. The frequency error estimate is computed from a long term average based on time tracking loop updates. This novel method of compensation for sleep oscillator error does not require oscillator re-calibration so that power consumption overhead is incurred only in the initial oscillator calibration.

Still another advantage of the invention over prior art is its generality. The communication device and its timer design applies to any intermittent communication system that utilizes a framing structure for the scheduling of messages. The frequency of the reference oscillator and sleep oscillator is arbitrary in contrast to the timer presented in U.S. Pat. No. 5,623,425 by Kivari et al. wherein the timer structure required that the reference oscillator frequency be a multiple of the sleep oscillator frequency. That is an important consideration when other constraints determine the oscillator frequencies. For example, the sleep timer oscillator may be a watch crystal with specific frequency 32.768 KHz selected because it serves a dual purpose in supporting real time clock oscillator as well as sleep oscillator. The reference oscillator frequency may be picked because of its suitability for a communications standard. For example 13 MHz and 26 MHz are almost universally used as reference oscillator frequencies for GSM cellular phones.

Yet another advantage of the invention is that the structure of the timer supports a general real-time scheduling structure for processing events for the communication device. The scheduling is precise and the event can occur either during sleep mode or active mode because system time is maintained accurately continually as the device switches back and forth between sleep and active modes. Such real-time processing events are useful, for example, for precise timing in sequential powering up of portions of the receiver such as frequency synthesizer power up prior to active mode reception and also in precise termination of sleep mode itself. The timer also has provision for premature termination of sleep mode due to keypad interrupt by the user prior to scheduled termination without degradation of the timer accuracy in maintaining system time.

The system of the present invention operates a communication device with reduced power consumption wherein the communication device receives radio signals containing intermittently scheduled digital messages and comprises receiver means that provide for frequency downconversion of said radio signal and demodulation of said digital messages; controller data processing means that provide for data processing of the demodulated message data to extract the messages, said data processing including decoding, deinterleaving, and parity checking, and extraction of control data, specifically designation of system time for message arrivals. A dual mode timer for extending battery life that uses a reference oscillator having a voltage controlled crystal oscillator means to generate a reference clock, wherein the frequency of said reference clock is high enough to serve as clocking requirements for digital processing in the receiver and controller, and wherein the frequency of said reference clock is responsive to input of an automatic frequency control word to the reference oscillator, and a sleep oscillator that generates a free-running sleep clock with a very low frequency and wherein power consumption of the sleep oscillator is very low relative to the power consumption of the reference oscillator;

storage means to contain a controller microprocessor program and data memory and register data memory; and controller means to supervise operation of the components of the communication device, particularly operations and algorithms that relate to power savings, wherein said supervision is executed by microprocessor operation with program memory contained in said storage means. In accordance with the invention, the controller means includes controller scheduling means that schedules commands for supervision of the communication device, particularly as relates to power savings, by writing command records to an event scheduler, controller frequency tracking means that provide for conventional automatic frequency control wherein the received downconverted signal is processed to generate a frequency control word for the reference oscillator at the rate of once per message reception such that the frequency of the reference oscillator clock is frequency-locked to the received signal, controller time tracking means that process received signal samples to estimate system time error to serve as a tracking loop error discriminant and generates a feedback control word for adjustment of system time such that system time error is nullified by servomechanism principles, controller timer calibration algorithm that supervises automatic oscillator calibration of said sleep oscillator relative to said reference oscillator, uses data from said oscillator calibration to compute the correct sleep counter increment, and writes said increment into the sleep increment register, controller sleep mode adjustment algorithm which provides for computation of a correction term for system time to account for residual frame remaining in the sleep counter at the end of sleep mode and writes the correction term to reference counter modulus register at the beginning of active mode, controller message processing means that provide for conventional data processing of a demodulated message, including decoding, deinterleaving, and extraction of command message data that indicates schedule of system time for message arrivals;

In accordance with the present invention, the dual mode timer continually maintains system time while operating in one of two modes, an active mode or a sleep mode. The timer comprises a reference counter, a reference counter modulus register, a frame counter, a frame counter modulus register, a sleep counter, a sleep increment register, a multiframe counter, mode switch means, mode control logic, and event scheduler means.

The reference counter is provider for modulus counter means that counts cycles of the reference clock up to a modulus value stored in said reference counter modulus register and resets to zero at the next clock count, the reference counter generating system time during active mode in units of reference clock number represented by the current value in the reference counter. The reference counter generates a frame epoch output at the time of said reset. The reference counter also generates shifts in system time in units of reference clock cycles when a modulus value other than nominal is written to the reference counter modulus register.

The sleep counter provides for accumulator means that successively sums a fractional number, or sleep counter increment stored in said sleep increment register by said controller calibration algorithm, wherein the sleep increment is equal to the number of frames per sleep oscillator cycle. The accumulator means successively adds the sleep increment register value, but retains only the fractional part of accumulation and generates an integer carry epoch each time an integer carry occurs in the accumulation. The sleep counter is clocked by the sleep clock so that accumulation occurs at the rate of the sleep clock frequency. The integer carry epochs generated by the sleep counter therefore represent frame boundary epochs.

The frame counter provides for modulus counter means that counts input frame epochs generated by either the reference counter or the sleep counter, wherein the selection thereof is dictated by said mode switch means. The mode switch has two switch states, one state representing active mode when the frame epoch source is the reference counter and the other switch state representing sleep mode when the frame epoch source is the sleep counter. The mode switch is responsive to the mode control logic. The frame counter maintains continuity of count through changes in the mode switch state. The frame counter counts up to the modulus value contained in said frame counter modulus register and resets back to zero at the next clock cycle. The frame counter generates a multiframe epoch at each frame counter reset, the frame counter thereby generating system time in units of frame number in either active mode or sleep mode as represented by the current frame counter value.

The multiframe counter provides modulus counter means to count up to the modulus value stored in said multiframe modulus register and resets back to zero on the next count.

System time is defined in active mode as the triple (reference clock number, frame number, multiframe number) corresponding respectively to current count of the three registers (reference counter, frame counter, multiframe counter), and similarly defined in sleep mode except that reference clock number is undefined and ignored during sleep mode, system time being continuously generated as the mode switch alternates its state between active and sleep mode.

The event scheduler means provide registers for records of scheduled events, each scheduled event comprising a command word that initiates a processing event and the scheduled system time for execution of said command, the event scheduler continually monitoring system time for a match with the scheduled time in any of the records, said match causing execution of the command in the record for which the match occurs, the types of scheduled commands including commands to the power controller means to selectively power up or power down components of the communication device at specified event times, commands to the mode control logic to switch the state of the mode switch from active mode to sleep mode or to switch the state from sleep mode to active mode at specified event times, command to generate interrupts to execute controller algorithms and operations such as controller time tracking means, controller frequency tracking means, controller timer calibration algorithm, controller sleep mode adjustment algorithm, and controller message processing means, command for receiver downconversion and demodulation of a scheduled message.

The mode control logic is responsive to the command from event scheduler to transition from active mode to sleep mode at a specified event time, at the instant of said event time resets the sleep counter to zero count and at time of uptick of the first sleep oscillator cycle following the first reference generator frame epoch following the event time gates off the clock input of the reference counter and simultaneously causes mode switch state to transition from active mode to sleep mode. The mode control logic is responsive to the command from the event scheduler to transition from sleep mode to active mode at a specified event time, at the time of first uptick of the first sleep oscillator cycle following said event time gates on the clock input of the reference counter and simultaneously causes the mode switch state to change from sleep mode to active mode.

The controller scheduler means writes command records to the event scheduler, which records effect power savings in the communication device by scheduling events that realize full benefits of power saving features of the invention. The scheduler means contain program memory in the storage means, the records including a first command to cause execution of controller timer calibration algorithm, scheduled for shortly after turn on of communication device, said command to provide for calculation of correct value of sleep counter increment to compensate for sleep oscillator error, thereby enabling synchronous operation of the communication device, a second command to execute controller sleep mode adjustment algorithm, scheduled for immediately following termination of sleep mode (start of active mode) and prior to first frame epoch in active mode, thereby limiting accumulation of system time error during sleep mode to less than one reference oscillator cycle, and thereby enabling synchronous operation of the communication device, a third command to cause controller means to execute the time track algorithm to update time tracking, scheduled for end of each active mode interval, thereby avoiding possible accumulation of system time error due to repetitive occurrences of sleep mode, and thereby enabling synchronous operation of the communication device, down conversion commands to receiver means to perform downconversion and synchronous demodulation and controller means to process received message, with event time coinciding with message arrival times, with no requirement to schedule reception and controller processing for reacquisition owing to synchronous operation of the communication device, thereby minimizing power consumption for signal processing during active mode, power commands to the power controller to selectively power up components of the communication device only when needed, where event times are precisely designated so that power up intervals are the minimum interval required, as enabled by synchronous operation of the communication device, thereby avoiding power waste on timing margins that compensate for system time uncertainties, and mode controller commands to the mode controller to change state of the mode switch into and out of active mode with corresponding event times specified such that sleep mode duty cycle with low power consumption is maximized and active mode duty cycle with relatively high power consumption is minimized, as made possible by the synchronous operation of the communication device.

The system of the present invention utilizes a low power low frequency sleep oscillator during sleep mode thereby incurring lowest power consumption during sleep mode, and maintains synchronous operation with respect to received messages despite inherent frequency inaccuracies of the low power low frequency sleep oscillator used for clocking the timer during sleep mode, thereby substantially reducing power consumption in active mode by eliminating overhead for reacquisition of system time when entering active mode. Accurate system time is maintained continuously during sleep mode to an error less than a sleep clock cycle, as made possible by calibration of sleep mode increment counter, thereby enabling precise scheduling of power on intervals spanning both active and sleep mode, thereby avoiding power waste to compensate for system time uncertainties.

In accordance with the present invention, to achieve the system for power savings, there is further provided means for automatic calibration of the timer in an environment of changing temperature, including:

temperature sensing means for obtaining temperature measurements of the low-frequency oscillator; a calibration table maintained in non-volatile memory in the storage means such that the table is initially empty at power up of the communication device, the calibration table thereafter holding calibration records, each record comprised of sleep increment value calculated from sleep oscillator calibration data and temperature of the sleep oscillator during said calibration, and a method for automatic calibration of the timer. Initially after power up of the communication device, the controller schedules the timer calibration algorithm, and temperature measurement at time of calibration, to generate the first record for the calibration table and an initial value for the sleep increment in the sleep increment register. Thereafter temperature measurement is performed periodically at a pre-specified period, wherein if temperature remains constant no re-calibration is required and no action is taken. If temperature changes and the new temperature is in a record in the calibration table the corresponding calibration value for sleep increment is loaded into the sleep increment register, thereby re-calibrating the sleep timer for the new temperature. If temperature changes and the new temperature is not in a record in the calibration table, the controller schedules the calibration algorithm to obtain a new calibration value, the pair of new temperature and new calibration value entered as a new record in the calibration table, and the new calibration value is written to the sleep increment register, thereby re-calibrating the sleep timer for the new temperature. The automatic calibration of timer for temperature change continually maintains the correct value of sleep increment in the timer, thereby preserving accurate system time and synchronous operation of the communication device, thereby preserving the power savings of the invention in an environment of changing temperature. The utilization of memory of the calibration table in a changing temperature environment to reuse applicable prior calibration data thereby avoids unnecessary new oscillator calibrations that incur active mode overhead and associated waste of power.

Means are provided for automatic calibration of the timer in an environment of changing temperature and include a realtime clock with backup battery that operates continually through power down of the communication device; temperature sensing means for obtaining temperature measurement of the low-frequency oscillator; a calibration table maintained in non-volatile memory in the storage means such that at power up of the communication device, contents of the calibration table present just prior to power down of the communication device remain intact at power up of the communication device, the calibration table holding calibration records, each record comprised of a sleep increment value obtained by the controller sleep oscillator calibration algorithm and a temperature measurement of the sleep oscillator at the time of said oscillator calibration, and a method for automatic calibration of the timer wherein initially after first power up of the communication device, a time stamp is affixed to the calibration table, said time stamp indicating an expiration time that is a pre-specified interval of time into the future, where said prespecified interval is an aging allowance for the table, the controller schedules the timer calibration algorithm, and schedules temperature measurement at time of said calibration, to generate the first record for the calibration table and an initial value for the sleep increment in the sleep increment register. Thereafter temperature measurement is performed periodically at a pre-specified period. If temperature remains constant, no re-calibration is required and no action is taken.

If temperature changes and the new temperature is in a record in the calibration table the corresponding calibration value in said record is loaded into the sleep increment register, thereby re-calibrating the sleep timer for the new temperature;

If temperature changes and the new temperature is not in a record in the calibration table, the controller schedules the sleep oscillator calibration algorithm to obtain a new calibration value, and schedules a new temperature measurement, the pair of new temperature and new calibration value entered as a new record in the calibration table, and the new calibration value written to the sleep increment register, thereby re-calibrating the sleep timer for the new temperature.

At subsequent power up of the communication device, if the time stamp of the calibration table has expired, the calibration table is purged and new time stamp affixed with new expiration time, and said calibration method resumes as in initial power up of the communication device, thereby ensuring that invalidation of calibration data in the calibration table due to aging of the sleep oscillator crystal does not occur. If the time stamp of the calibration table has not expired the calibration method resumes as in initial power-up of the calibration method but now generally starting with a non-empty calibration table. The automatic calibration of timer for temperature change continually maintains the correct value of sleep increment in the timer, thereby preserving accurate system time and synchronous operation of the communication device, thereby preserving the power savings in accordance with the teachings of the invention in an environment of changing temperature. The utilization of memory of the calibration table in a changing temperature environment to reuse applicable prior calibration data thereby avoids unnecessary new oscillator calibrations that incur active mode overhead and associated waste of power.

The system for power savings of the present invention further includes means for automatic calibration of the timer in an environment of changing temperature, including:

estimator means for estimation of fractional frequency offset of sleep oscillator based on averaging of the time tracking loop updates during an active mode interval, a controller calibration tracking loop algorithm that utilizes said estimator means as a track loop discriminant to generate a feedback correction term for the sleep increment value in the sleep increment register such that errors in sleep increment value are nullified by control loop principles; and method for automatic calibration of the timer wherein at initial power up of the communication device the controller calibration algorithm is scheduled to generate the correct initial sleep increment value and write said increment value to the sleep increment register, thereafter at each active mode interval, said increment value in said sleep increment register updated by scheduling of said controller calibration track loop algorithm at the end of each active mode interval, thereby continually maintaining the correct value of sleep increment in the timer, thereby preserving accurate system time and synchronous operation of the communication device, and thereby preserving the power savings in accordance with the teachings of the present invention in an environment of changing temperature.

SUMMARY OF THE INVENTION

The present invention provides for a system for operating a communication device for reception of scheduled intermittent messages, wherein a dual mode timer is used to extend battery life. A controller powers down all idle components of the device between message receptions in a power saving sleep mode to conserve battery power. During active mode when the device is fully active in reception of messages the timer uses a reference oscillator with a relatively high frequency to support digital processing by the receiver. During sleep mode the timer uses a much lower frequency sleep oscillator to maintain the lowest possible level of power consumption within the timer itself. The timer provides for automatic calibration and compensation for the inaccuracies inherent to low-power low-frequency crystal oscillators used for sleep mode. The resultant improvement in timer accuracy during sleep mode minimizes or eliminates the need for an initial reacquisition period in the active mode interval thereby reducing power consumption during active mode as well.

DESCRIPTIONS OF DRAWINGS

FIG. 3A is an illustration of the configuration of the vector representing system time;

FIG. 3B is an illustration of the data structure an event-time table in the scheduler;

FIG. 3C, is an illustration of the structure of an event-command table in the scheduler;

DESCRIPTION OF THE INVENTION

Figure 1:
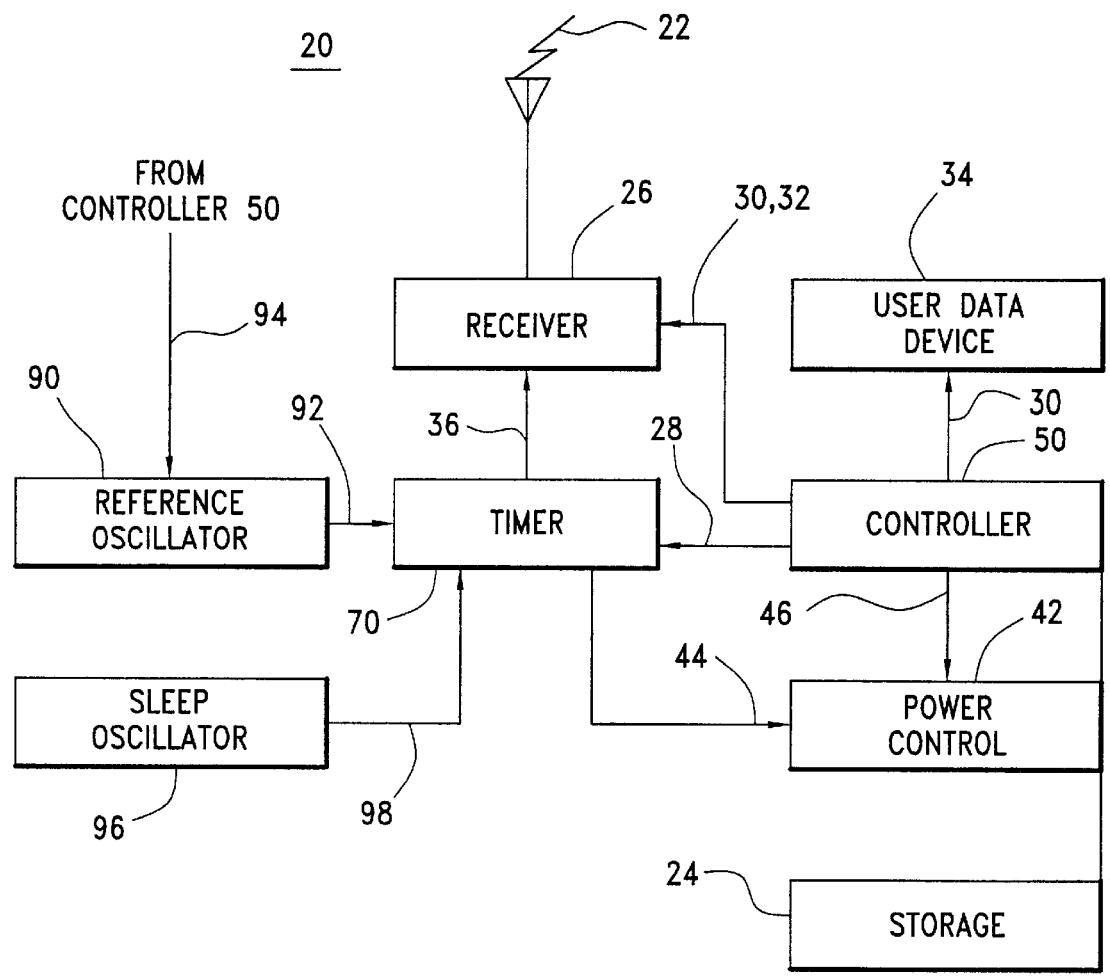
FIG. 1 is a block diagram of the communication device for intermittent reception of messages.

FIG. 1 shows a block diagram for a typical embodiment of the invention, a communication device 20 for intermittent message reception. The communication device may be a part of a larger system such as a cellular phone and therefore share other functions such as support of digital voice data for phone calls that are not a part of this disclosure. Radio signals 22 carrying messages intended for the device 20 are intermittently received by a conventional receiver 26. The receiver 26 provides means for frequency down-conversion and demodulation of the messages. The controller 50 is embodied as a software program executed in a microprocessor and supervises operation of the entire communication device 20. The controller provides data processing means for the demodulated data 30 from the receiver 26 such as decoding. A demodulated message 30 may be one of two types, a user message 30 such as a paging message which is directed by the controller 50 to a user device 34, or a control message processed by the controller. An example of control message contents is the scheduled time for intermittent messages. The controller also includes frequency and time tracker algorithms which operate on received samples provided by the receiver. Storage means 24 contain microprocessor program memory and data such as the received demodulated messages.

In FIG. 1 the timer 70 generates the system time which is a local representation in communications device 20 of the timing epochs in the received signal 22. The system time is represented in this disclosure as having the general periodic form of basic reference clock cycle, frame period, and multiframe period for an intermittent signal. The reference clock cycle is a submultiple of the symbol period, a frame is an integer multiple of a clock epoch, and a superframe is an integer multiple of a frame. The schedule for arrival of a message burst at the communication device 20 is designated in terms multiframe number, frame number, and reference clock cycle. As a numerical example for the GSM worldwide cellular phone standard having a data rate of 272 Kbps, a receiver would typically use a reference clock cycle of length one quarter bit, a frame is 5000 quarter bit clock cycles, and a multiframe is either 26 or 51 frames in length. Frame structures are commonly used in intermittent communications systems to provide reference points in time for scheduling of data or message events. Small variations from the system time structure used in this disclosure are possible but the invention description as presented herein extends in obvious ways to those cases.

A power controller 42 provides means for controlling battery power supplied to the components of the communications device in response to real-time commands 44 from the timer 70, or to commands 46 from the controller 50.

In FIG. 1, a reference oscillator 90 provides the reference clock 92 for the timer 70. The reference oscillator is a conventional voltage controlled crystal oscillator. That is, the frequency of reference oscillator clock 92 is controlled by a frequency control signal 94. A conventional frequency tracker algorithm in the controller processes received samples from a message burst to generate the control signal 94 such that the frequency of the reference oscillator clock 92 is either phase or frequency locked to the received signal 22 during message reception. Such frequency tracker algorithms are well known to those skilled in the art. The frequency of the reference oscillator is sufficiently high to support receiver digital processing of messages. For current generation digital cellular phone technology a typical reference oscillator clock is of the order of a megahertz, and typical reference oscillator power consumption is two milliamperes. It is understood that the reference oscillator depicted in FIG. 1 may contain a crystal oscillator of higher frequency than the frequency of the reference clock 92 to support digital processing within the communication device 20 and the reference clock 92 for the timer may be derived by frequency division therefrom. It is further understood that a phase locked loop not shown in the figures may be utilized to further upconvert the frequency of the reference oscillator to support high speed processing clocks such as for the controller microprocessor.

In FIG. 1, in support of sleep mode a sleep oscillator 96 provides a second reference clock 98 for the timer 70. The sleep oscillator is a conventional free-running crystal oscillator but with a frequency that is much lower than that of the reference oscillator signal 92. As a consequence of the lower frequency the sleep oscillator has a much lower power consumption than the reference oscillator. For example, in a typical embodiment of the sleep oscillator a real-time clock operating at 32.768 KHz would be used, and resultant battery drain for the sleep oscillator with present day technology is approximately five microamperes which is several orders of magnitude lower in power consumption than the reference oscillator.

The communication device 20 is configured to operate in one of three mutually exclusive and exhaustive states: (1) active mode, (2) sleep mode, or (3) off. The off state is the uninteresting state where no component of the communication device 20 is drawing power from battery and is discussed no further in this disclosure. Active mode is defined as the state wherein the reference oscillator 90 is powered up to support processing in the communication device 20. Active mode includes the message reception interval when the receiver is demodulating a received message, and any time when the controller microprocessor is gated on such as for received message data processing and decoding. Active mode also includes a calibration interval to be presently described wherein the operation of the reference oscillator 90 is essential. Because the power consumption of the reference oscillator 90 is much larger than that of the sleep oscillator 96, the reference oscillator is powered up only when its operation is essential to support processing in the communication device 20. At other times the sleep oscillator 96 is powered up to support maintenance of system time and that state constitutes sleep mode. During sleep mode only the sleep oscillator 96 and the part of the sleep timer 70 that supports sleep mode are powered up and clocks enabled; all other parts of the communication device 20 are powered down and clocks disabled.

In FIG. 1, the power controller 42 provides means for switching of power, typically from a battery not shown, to the components of the communication device on a need basis so that only essential components are powered on at any time. The power controller 42 is responsive to switching commands 46 from the controller or precisely scheduled real-time commands 44 from the timer.

Timer

Figure 2:
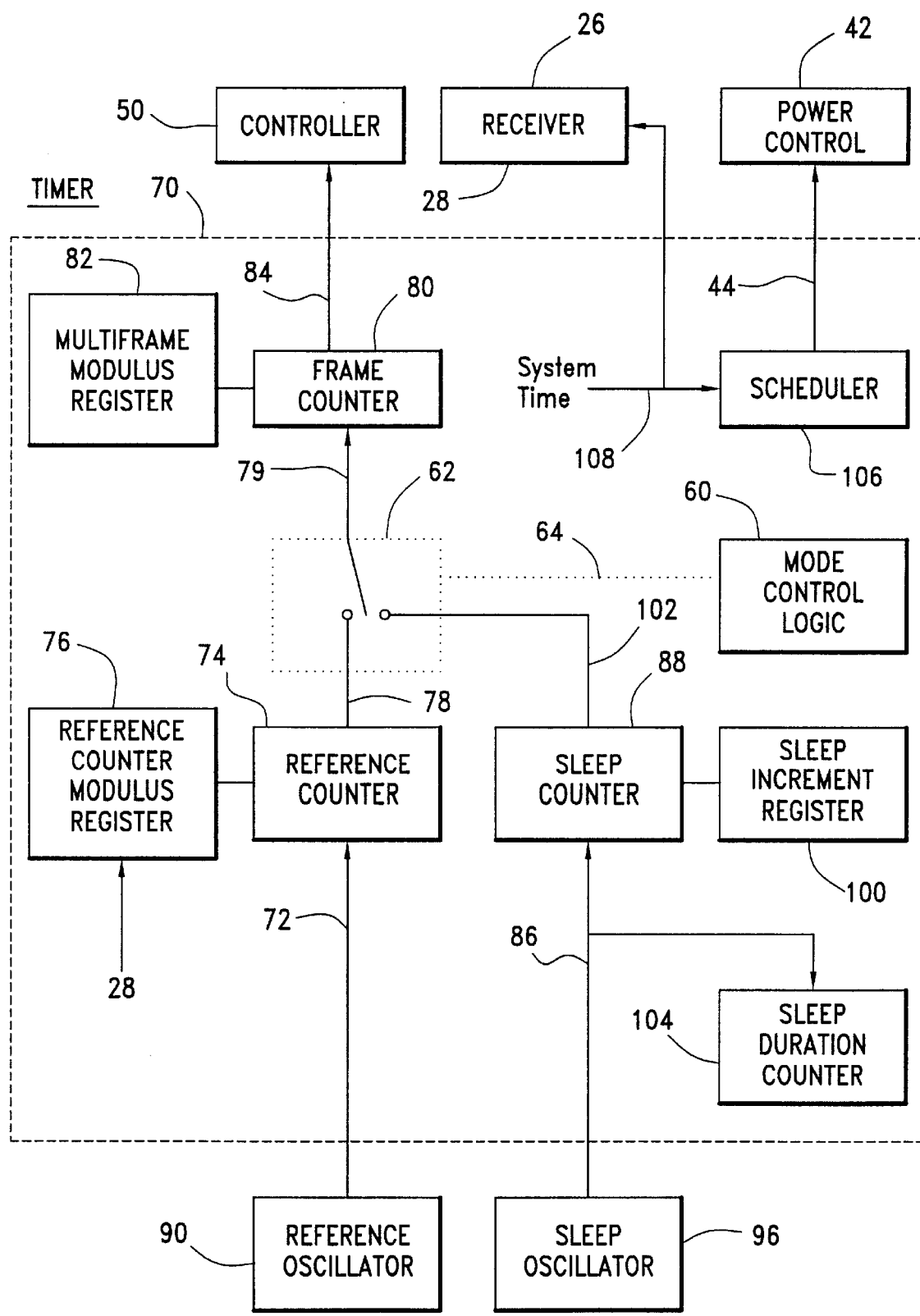
FIG. 2 is a block diagram showing details of the timer.

FIG. 2 is block diagram that illustrate details of a typical embodiment of the timer 70. In active mode the timer 70 comprises means to generate system time in units of timer cycles, frames, and multiframes. A frame is an integer number F of timer cycles, and a multiframe is an integer number S of frames. From initial value zero, a reference counter 74 repeatedly counts the cycles of the reference clock 72 from the reference oscillator 90 up to modulus value F−d−1 and resets to zero at the next count. The modulus value is held in reference counter modulus register 76. The reference counter 74 generates a frame epoch 78 at each reset.

In FIG. 2 in active mode control logic 60 has means 64 to set switch 62 so that the reference counter frame epochs 78 are directed to the input 79 of a frame counter 80. From initial value zero, the frame counter 80 repeatedly counts the frame epochs 78 of the reference counter 74 up to frame counter modulus value S−D−1 and resets back to zero at the next count. The frame counter modulus value S−D−1 is held in frame counter modulus register 82. The frame counter 80 generates a multiframe epoch 84 at each reset. The controller 50 then counts the multiframe epochs 84 to obtain units of system time in multiframes.

In FIG. 2, the modulus value F−d−1 in the reference counter modulus register 76 can be written with a new value by the controller 50 any time before the frame counter 74 reaches the current frame modulus value in register 76. The default value of the variable d in the modulus value F−d−1 is zero corresponding to the generation of nominal frame lengths by the timer. By using a value of d other than zero, the controller advances or retards system time d units by commanding a control word 28 that causes corresponding modulus value F−d−1 to be written to the reference counter modulus register 76. The parameter d which provides for adjustment of system time is in units of reference clock cycles, and the value of d is a control word 28 generated by a time tracker algorithm in the controller. The time tracker implements a conventional time tracking loop by means well known to those skilled in the art. Similarly, the controller 50 can adjust system time in units of D frames when writing the frame counter modulus value S−D−1 to the frame counter modulus register 82.

In FIG. 2, from an initial value of zero the sleep counter 88 repeatedly accumulates a fraction δ held in the sleep increment register 100, where the sleep counter accumulations are clocked by the low-frequency clock 86 supplied by the sleep oscillator 96. The sleep increment value δ in sleep increment register 100 is the estimated number of frames per sleep clock cycle, where sleep increment δ is obtained initially by an oscillator calibration procedure presently described. The integer part of the accumulation in the sleep counter 88 is not retained but whenever an integer rollover occurs the sleep counter 88 generates a frame epoch 102. During sleep mode the mode control logic 60 sets switch 62 so that the frame counter counts frame epochs 102 from the sleep counter 88 instead of the frame epochs 78 from the reference counter 74 as in active mode. That is, the frame counter 80 counts frame epochs from the reference counter 74 during active mode and from the sleep counter 88 during sleep mode. The position of switch 62 defines precisely whether sleep or active mode is operative at any instance of time.

In FIG. 2, as the timer 70 switches back and forth between active and sleep mode, the mode control logic 60 alternately causes the switch 62 to toggle the frame counter input 79 between reference counter output 78 and sleep counter output 102, respectively. Meanwhile, the frame counter 80 continues to count during mode transitions so that system time is maintained in units of frames seamlessly.

Importantly, the accuracy of system time is maintained to within one reference clock cycle during active mode. Importantly, the accuracy of system time during sleep mode is maintained continually to the accuracy of one sleep clock cycle provided that the correct value of sleep increment δ is used in the sleep clock increment register 100. Since the resolution or clock cycle of the reference oscillator is much smaller than that of the sleep oscillator, the timer accuracy in sleep mode is still much worse than in active mode. Importantly, a sleep mode fine adjustment to be presently described, applied immediately after sleep mode, reduces the effective sleep mode timing error to approximately the same magnitude as that of active mode. That is, when the timer transitions from maintenance of system time in high resolution active mode to low resolution sleep mode and back to high resolution active mode, no more than one high resolution cycle error is incurred after the fine adjustment is applied.

In FIG. 2, the reference counter 74 is disabled and supporting reference oscillator 90 is powered down by the event scheduler 106 during sleep mode to minimize power consumption. During active mode the sleep counter 88 is disabled but its supporting low frequency oscillator 96 may remain powered up due to its very low power consumption.

In FIG. 2, during active mode system time is defined as the composite of current values contained in reference counter 76, frame counter 80, and multiframe counter in the controller 50. That is, system time in active mode is expressed as the current composite clock cycle number, frame number, and multiframe number. During sleep mode system time is defined only by frame number. During active mode the system time 108 is made available to the receiver 26 to be used in ways known to those skilled in the art to support digital processing of the received messages. For example, system time is used to define symbol and message burst boundaries in order to perform digital demodulation of message data.

In FIG. 2, the system time during both active and sleep modes is an input 108 to a scheduler 106. The scheduler 106 provides means for scheduling control events to occur with precise timing at certain system times whether in active mode or sleep mode. In particular the scheduler commands the power controller to power up or power down components of the receiver 20 at scheduled system times.

Scheduler

FIGS. 3A, 3B, and 3C illustrate the basic data structures employed by the scheduler for scheduling of events based on system time. FIG. 3A shows the vector representing system time as comprising reference clock cycle number, frame number, and multiframe number as readable respectively from reference counter 74, frame counter 80, and multiframe counter in the controller 50. The scheduled events are representable by two tables, an event-time table 110 illustrated in FIG. 3B, and an event-action table 112 illustrated in FIG. 3C. The event-time table 110 defines the system time when each scheduled event is to occur, and the event command table 112 designates the digital command word that is generated at the scheduled event time to effect the desired event. For example, the powering on of the frequency synthesizer in the receiver is an event and the corresponding command for that event would be the appropriate command word 44 for the power controller 42 for the powering on of the synthesizer. Generally, the controller 50 schedules events by writing to the event-time table and event-action table during active mode only because the controller is inactive (microprocessor gated off) during sleep mode. However, the scheduled event time may occur during sleep mode. This is because the scheduler and power controller can operate during sleep mode and events that power up components of the communication device 20 prior to the termination of sleep mode is possible and in fact an important capability of the invention. For example, the powering up of the reference oscillator must precede the scheduled termination of sleep mode by a predetermined amount in order to allow for settling time of reference oscillator before it is used as an active mode reference clock. Whether in active mode or sleep mode the scheduler continually monitors for a match between current system time and scheduled system times in the event-time table. If a match occurs in the event-time table, the command for that event in the event-action table is executed.

It is understood that an event may represent the starting of a state machine as known in the art that effects a preprogrammed sequence of events. The state machine represents a sequence of programmed event times in the form of delays and associated commands to be executed at the respective delay times. State machines are useful for example, in scheduling a predetermined power-up sequence for the communication device 20.

In FIG. 3, the system time during sleep mode is not maintained in either the frame counter, or the multiframe counter. During sleep mode the scheduler performs matches of current system time with scheduled events only on the frame count. This implies that the event actions in the scheduler occur on frame boundaries during sleep mode. However, an event can be made to occur between frame boundaries by scheduling of a simple state machine with delay.

Mode Control Logic and Fine Sleep Adjustment

In FIG. 2, the mode control logic 60 provides switching and control means to effect transitions of the timer 70 between sleep and active mode. The mode control logic provides means 64 to switch the frame counter input 79 from the frame counter frame epochs 78 to the sleep counter frame epochs 102 at the instant of transition from active to sleep mode. The mode control logic provides means for the reverse operation for transition from sleep mode to active mode.

Figure 4:
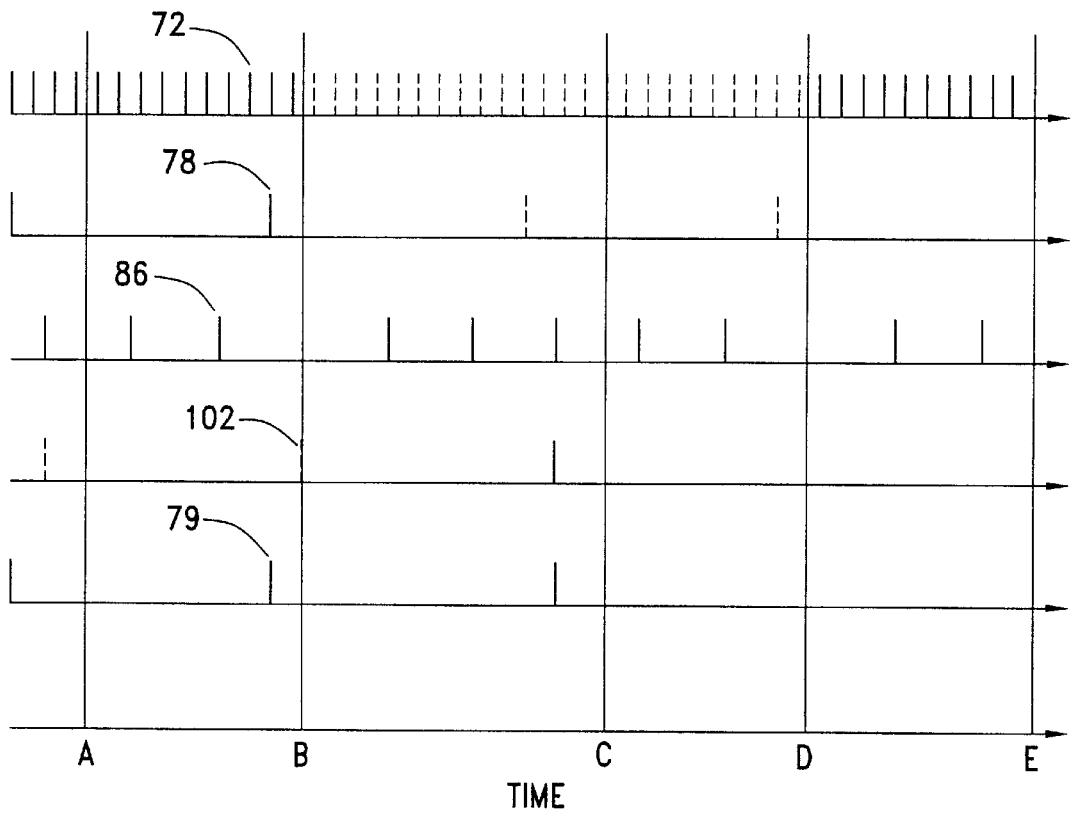
FIG. 4 is a timeline illustrating timing of the mode control logic during mode transitions.

The timing diagram of FIG. 4 describes by way of example the timing for the mode control logic 60 as the timer 70 switches between active and sleep modes. In the example, the timer is initially in active mode, switches to sleep mode, then switches back to active mode. The ticks in the timing diagram in FIG. 4 indicate the reference oscillator clock 72, reference counter frame epochs 78, sleep oscillator clock 86, sleep counter frame epochs 102, and frame counter input clock 79. The dashed ticks indicate when a clock is gated off. When sleep mode is scheduled by the controller to begin at time A, the reference counter 74 counts past time A, past the first reference counter frame epoch following A and up to the first clock edge of the sleep oscillator clock 88 at time B. At time B, the mode controller switches the frame counter input 79 from the reference counter frame epochs 78 to the sleep counter frame epochs 102. Accordingly in FIG. 4 the frame counter input 79 coincides with the reference counter frame epochs 78 prior to time B and coincides with sleep counter frame epochs 102 immediately after time B. At time B, the reference counter input is disabled and the reference oscillator 90 which is the clock source for the reference counter is powered down. At time B the sleep counter 88 is reset and enabled. The sleep duration counter 104 is reset to zero and enabled. At time B active mode terminates and sleep mode begins. Scheduled termination of sleep mode occurs at time C, or alternately termination is triggered by a keypad interrupt from the user. The sleep counter continues to count through time C until time D when the first sleep counter frame epoch following time C occurs. At time D sleep mode terminates and active mode begins. At time D the mode control logic 60 disables the sleep counter input clock 86, enables the reference counter clock 72, switches the frame counter input 79 from the sleep counter frame epochs 102 to the reference counter frame epochs 78, and disables the sleep duration counter 104. The reference counter 74 is not reset at time D but resumes the count it had at the termination of the prior active mode at time B.

At time D in FIG. 4 the mode control logic 60 cues the controller 50, for example by means of hardware interrupt, to apply a sleep mode fine time correction to the timer. In response the controller computes a sleep mode adjustment d to system time according to the relation $$d=F*y$$

F=reference counter nominal modulus equal to number of reference oscillator cycles per frame y=sleep counter accumulator value at termination of sleep mode The sleep mode adjustment d represents a shift in system time and accordingly the controller writes the quantity F−d−1 into the reference counter modulus register 76. The sleep mode adjustment is a small correction factor that accounts for the small residual fractional frame that remains in the sleep counter accumulator at time D which was not reflected in system time during sleep mode. The sleep mode adjustment is a fine correction that is smaller than a cycle of the sleep oscillator clock 86. At time E at the first occurrence of a frame epoch after switching to active mode, the sleep mode fine adjustment d has been absorbed in the system time generated by the timer 70. There exist alternative means to compute the sleep mode adjustment but the preferred embodiment is the most computationally efficient method.

In summary, under the assumption that the sleep increment value contained in the sleep increment register 100 is sufficiently accurate, the timer accumulates no more than one sleep oscillator clock cycle for each sleep mode interval which corresponds to the resolution of the timer during sleep mode. Immediately after sleep mode, after the application of the fine sleep adjustment to the timer the accumulation of error during sleep mode has been reduced to one reference oscillator cycle which is the resolution of the timer during active mode. Then importantly, the timer reduces accumulated timing error during sleep mode to the lower limit equal to a reference oscillator clock cycle and this is sufficient accuracy to maintain synchronization of the communication device 20 with the received radio messages 22. By maintaining synchronization during sleep mode, reacquisition in active mode becomes unnecessary thereby conserving power during active mode.

During sleep mode the timer continually maintains system time with an accuracy equal to the timer resolution which is the sleep oscillator clock cycle. Then importantly, accurate system time is continually available during sleep mode to schedule processing events such as powering on components of the communication device prior to active mode. Power savings are achieved by accurate timing because the need for early power-on scheduling to compensate for system time uncertainties is eliminated.

Sleep Oscillator Calibration and Compensation

The timer can maintain the degree of accuracy described earlier in this disclosure only if the value of sleep increment parameter in sleep increment register 100 is sufficiently accurate. The sleep increment parameter is a characterization of the relative frequency of the sleep oscillator with respect to the reference oscillator. The reference oscillator 90 provides the reference clock for the timer 70 during active mode. Since the reference oscillator is frequency or phase locked to the received signal 22 the accuracy of the reference oscillator is not an issue for active mode. In contrast, the low-frequency sleep oscillator 96 which provides the clock for the timer 70 during sleep mode is free running. Moreover, low frequency oscillators generally have large frequency errors relative to specifications, where the frequency error depends on temperature and on aging effects. An accurate measurement of the actual frequency of the sleep oscillator is determined by an automatic calibration procedure and the relative frequency of the sleep oscillator is reflected in the sleep increment parameter value. With the correct value of sleep increment parameter value in the sleep increment register 100, system time is accurately maintained during sleep mode and the sleep increment compensates for any frequency errors in the sleep oscillator relative to specified frequency.

The correct value δ for the sleep counter increment register is computed by the controller according to the relation:

$$\delta = (f_2/f_1) F$$

$f_1$ = frequency of sleep oscillator clock 86
$f_2$ = frequency of reference oscillator clock 72
F = number of reference oscillator clock cycles per frame The computation of the ratio of frequencies $f_2/f_1$ based on specifications of nominal crystal oscillator frequencies yields unacceptable timer accuracy. In the invention the ratio $f_2/f_1$ is automatically measured by standard oscillator calibration methods known to those with ordinary skill in the art. For oscillator calibration the number of cycles N1 of the sleep oscillator and cycles N2 of the reference oscillator are counted over an oscillator calibration time interval of Tc seconds. The ratio N1/N2 is an approximation to the ratio $f_1/f_2$ and the approximation error approaches zero with increasing oscillator calibration time Tc. The calibration time required for sufficient accuracy is system dependent but the criterion for sufficiency can be stated, for example, as long enough that the resultant sleep mode timing error is negligible (for example one-eighth) relative to the timer resolution in active mode. For present day digital cellular radio systems such as GSM a typical requirement for calibration time Tc is approximately 10 seconds.

Calibration can only be performed in active mode because the reference oscillator must be powered on for oscillator frequency measurement and the controller must be gated on to compute the parameter value δ for the sleep increment register.

Importantly, with a sufficiently long calibration time Tc the cumulative timer error incurred in one sleep mode interval is at most one timer clock cycle. This timer accuracy is maintained only as long as the calibration estimate of the frequency ratio $f_2/f_1$ remains valid. In fact timer calibration is valid only at the temperature of calibration and timer recalibration is generally required when the temperature changes. The invention provides for two methods for automatic recalibration: (1) by means of lookup table, and (2) by means of a calibration tracking loop.

Timer Recalibration by Lookup Table

Figures 5A, 5B:
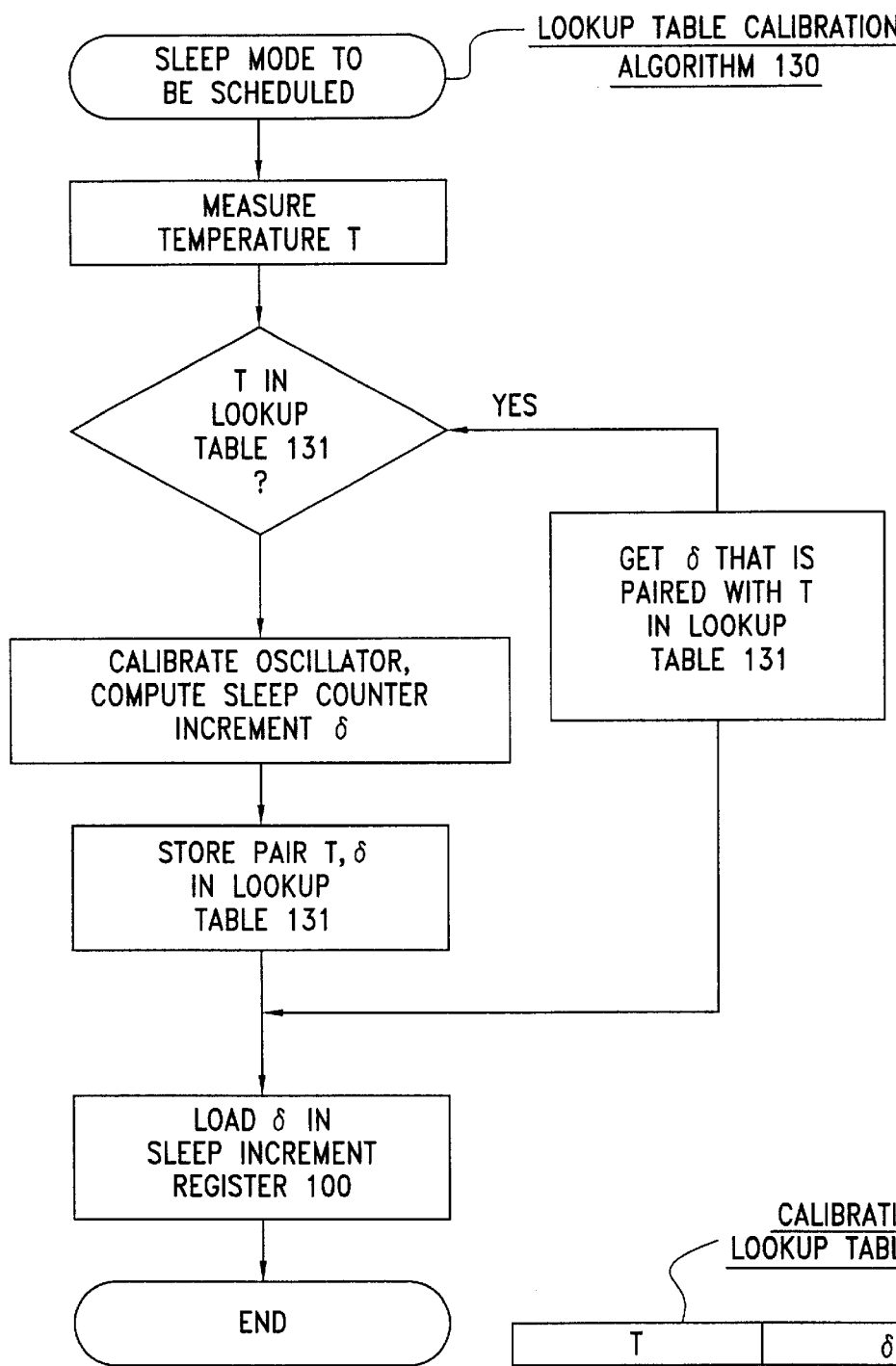
FIG. 5A is a flow diagram for the timer calibration algorithm using the method of lookup table.
FIG. 5B is an illustration of the structure of the lookup table for timer calibration.

FIG. 5A illustrates a flow diagram for an automatic timer calibration algorithm 130 for execution by the controller 50 in a changing temperature environment. Whenever the controller 50 schedules sleep mode, it first performs the automatic calibration algorithm 130. The calibration algorithm uses a lookup table 131 shown in FIG. 5B which contains records of prior calibrations. Each record holds a pair of values T and δ where δ is the sleep increment value obtained from the timer calibration procedure described earlier, and T is the temperature at the time of calibration. In the algorithm 130 the controller first reads the temperature T of a thermistor 140 which is situated for accurate measurement of the sleep oscillator temperature. If the value of thermistor temperature T appears in the calibration update table, the corresponding sleep increment δ is read and loaded into the sleep counter increment register 100. If value T is not in the calibration update table, then T represents a new temperature and the calibration procedure is performed to obtain the corresponding new sleep increment δ. The new pair δ and T is stored as a new record in the calibration table. The new sleep increment δ is then loaded into the sleep counter increment register 100 in preparation for sleep mode.

The calibration lookup table 131 resides in storage 24 which may be embodied as either non-volatile or volatile type memory. In the case of non-volatile memory wherein sleep oscillator crystal aging effects may render the calibration data invalid, the lookup table is periodically refreshed. The lookup table 131 is stamped with an expiration time that allows for a predetermined maximum aging limit. When the time stamp expires the entire contents of the table are purged and a new time stamp applied thereby ensuring that no calibration data exceeds the maximum aging limit. The temperature T in the lookup table 131 is understood to be quantized, where the selection of the quantization step size is specific to the communication system. Obvious variations on the use of lookup table such as interpolation lookup, non-uniform quantization of temperature, etc., are included in the invention.

Importantly, the timer calibration algorithm by lookup table enables the timer to maintain approximately the same level of accuracy as at initial calibration in an environment of changing temperature. Importantly oscillator calibration which incurs active mode overhead is performed only when essential, i.e., when no prior valid calibration data is available in the lookup table.

Timer Calibration by Servo Loop

Figure 6:
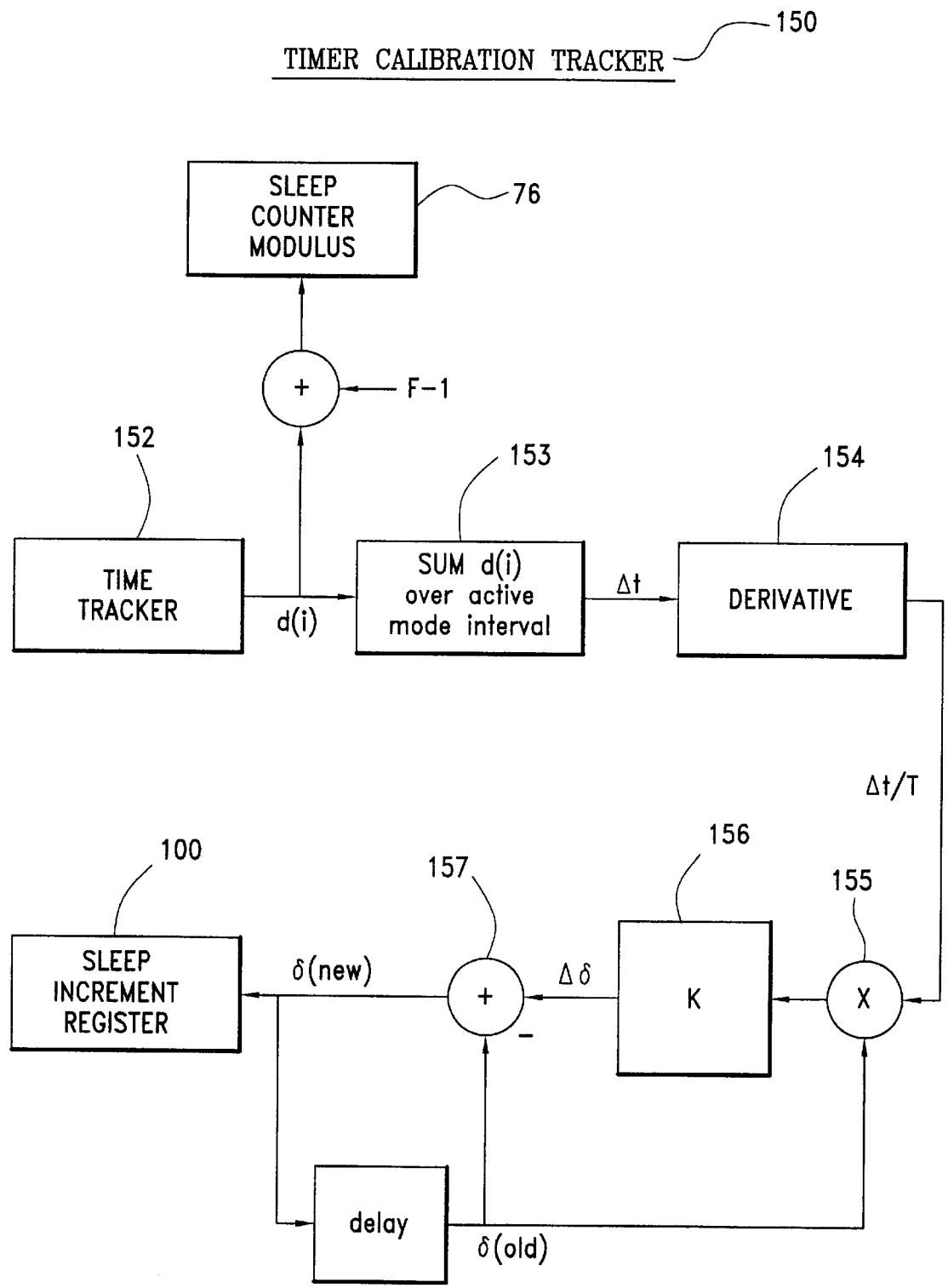
FIG. 6 is a block diagram describing for timer calibration by servo loop.

The invention provides for an alternative means for automatic timer calibration in a changing temperature environment. Initially, the oscillator calibration procedure previously described is performed only once prior to the first sleep mode occurrence. The calibration provides an initial accurate calculation for sleep increment value δ for the sleep counter increment register 100 and is valid for the temperature at the time of initial calibration. Thereafter, any error in the sleep increment δ due to temperature change is sensed and corrected by feedback through the timer calibration servo loop 150 illustrated in FIG. 6. During active mode a conventional time tracker 152 in the controller maintains a conventional digital time tracking loop by generating a loop update d based on the samples of a received message. Thus during active mode the conventional time tracking loop generates a time shift d to system time for each received message by writing the value F−d−1 to the reference on sleep counter modulus register 76 to maintain synchronism with the received signals 22 from the base station. Generally, there are N messages received during an active interval. In FIG. 6 the time shift accumulator 153 computes the active mode time update Δt by adding all time tracker time shifts d=d(i), i=1,2, ..., N applied during one active mode period. The derivative 154 forms an estimate of the fractional time error, or equivalently fractional frequency error, by dividing the time update total Δt by the interval T between successive active mode occurrences. The derivative Δt/T is multiplied by the previous sleep increment value δ and the loop gain K 156 to obtain the required change −Δδ to the sleep increment. The previous value of sleep increment is then added to the required change Δδ to obtain the new increment δ which is written to the sleep increment register 100 in preparation for the next sleep mode. In this way the tracker in FIG. 6 forms a first order tracking loop to update the sleep increment.

Importantly, the calibration servo loop 150 maintains the accuracy of the timer in an environment of changing temperature by utilizing feedback information to null calibration error for the sleep increment 100. Importantly, the calibration by servo loop incurs no active mode overhead time for oscillator calibration as in the case of calibration by lookup table. Moreover, temperature readings are not required for calibration by servo loop.

Theory of Servo Loop Calibration

[It is not obvious that the calibration tracking loop 150 of FIG. 6 corrects sleep increment calibration errors that may]

It is not obvious that the calibration tracking loop 150 of FIG. 6 corrects sleep increment calibration errors that may develop due to temperature change, and the following theory provides the supporting rationale. As described before, the correct value of the sleep increment parameter δ of the sleep increment register 100 after initial calibration is given by $$\delta = (f_2/f_1)F$$

$f_1$ = sleep oscillator clock frequency
$f_2$ = reference oscillator clock frequency
F = number of reference oscillator clock cycles per frame If a small temperature change occurs, a small sleep oscillator frequency error $\Delta f_1$ will occur. Then a simple perturbation analysis yields the needed correction Δδ in the sleep increment:

$$\begin{aligned}\delta + \Delta\delta &= \frac{f_2}{f_1 + \Delta f_1}\frac{1}{F} \\ &= \frac{f_2}{f_1}\frac{1}{F}\frac{1}{(1+\Delta f_1/f_1)} \\ &\approx \frac{f_2}{f_1}\frac{1}{F}(1-\Delta f_1/f_1) \\ &= \delta - \delta(\Delta f_1/f_1) \\ \Delta\delta &= -\delta(\Delta f_1/f_1) \\ &= -\delta(\Delta t/T)\end{aligned}$$

where Δt/T is the fractional time error measured, for example, by the time tracker. The preceding equations describe the change in sleep increment needed to reflect a small change in sleep oscillator frequency due to temperature change. The first equation is a perturbation equation that is asymptotically correct for small parameter changes. The approximation in the third equation is a Taylor series approximation which is asymptotically correct for small perturbations. The final equation replaces the fractional frequency error with its equivalent, the fractional time error. The final equation can be seen to correspond to the tracking loop in FIG. 6 when the loop gain 156 is set to unity. The tracker derivative 154 in FIG. 6 is an estimate of the fractional time error Δt/T assuming that all tracking loop updates are due to sleep oscillator error. Elementary control theory teaches that the loop gain 156 should be set to a small value so that the tracking loop filters thermal and quantization noise effects and that the tracking loop will still drive the tracking error to zero, i.e, cause the sleep increment to converge to the correct value.

In the tracking loop of FIG. 6, the current increment d is fed back to serve as a loop gain factor 156, so that the loop gain is time varying. However the loop gain factor 156 can be fixed by setting its value equal to the initial calibration value of δ or the nominal value of δ based on nominal sleep oscillator frequency specification. This is because variations in the value of d are very small (less than 1%) and variations of such small magnitude in the loop gain do not vary the basic operation and performance of the tracking loop.

Operation, Use, and Scope of the Invention

The invention provides for a communication device 20 for intermittent reception of messages with means for power savings. The invention is useful in such communication systems as battery operated cellular phones and pagers where power savings is important. The invention applies to intermittent message receptions where messages arrive according to a schedule known to the communication device. Communication systems that deliver messages according to such intermittent schedules generally utilize a framing structure to serve as a time reference for designation of message arrival times. The invention description used a specific framing structure as an example, and the invention applies to variations in framing in obvious ways. For example the hierarchy of frames and multi-frames of the invention could be extended to larger framing units such as a hyperframe where a hyperframe is a multiple of multi-frames, and so forth. The corresponding obvious modification to the invention's time keeping structure is the simple addition of a counter to maintain hyperframe count.

The controller learns the arrival schedule of information and control messages to be received by the communication device 20 by means of scheduling data contained in the demodulated control messages 32. For each message arrival, the controller 50 programs the scheduler 106 in the timer 70 to power up and power down all components needed to support active mode processing of the message. The components powered up for active mode include the receiver 26, controller 50, and reference oscillator 90. The programming of the scheduler is itself performed during active mode when the controller 50 is powered up. The actual times for powering up and down are specific to the application and allowances for warmup time and settling time in scheduling is required. Importantly, the timer maintains system time accuracy to within the resolution of the timer clock thereby maintaining synchronism of local system time with the received messages through both active mode and sleep mode. Therefore, the controller scheduling for active mode need not include overhead time for preliminary acquisition prior to message reception as in the case when synchronization is lost, thereby achieving power savings in active mode. This characteristic of the invention to maintain synchronization has power saving benefits for current generation digital cellular phone systems such as GSM (second generation cellular systems as known in the art). The invention has capability of maintaining synchronization at much high data rates so that this power saving benefit of the invention extends to next generation higher data rate cellular phone systems as well.

The controller 50 programs the scheduler 106 when to begin sleep mode and when to terminate sleep mode. The precise instant of switching to or from sleep mode, as executed by switch 62 in the timer 70, occurs on a sleep oscillator clock boundary and that fine level of switching is controlled by the mode control logic 60 in the timer. With the control logic and associated timing as described in FIG. 4 the timer 70 loses or gains no more than one clock cycle when transitioning into and out of sleep mode. A clock cycle lost or gained during sleep mode is tracked out by the time tracker during active mode. In this way the timer maintains a system time accuracy of approximately one clock cycle during active mode as well as sleep mode. Maintenance of accurate system time permits precise scheduling so that there is no need to provide longer power-up intervals than needed to compensate for system time uncertainties. That is, timing accuracy implies power savings.

Importantly, the achievement of the very high level of accuracy in system time as achieved by the invention during sleep mode with a low-power, low-frequency, sleep mode oscillator is made possible by the automatic timer calibration algorithms. Two methods are disclosed, calibration by lookup table 130, and calibration by servo loop 150, and each has its advantages. The calibration by lookup table 130 is typically preferable in an environment of very rapidly changing temperature, and the calibration by servo loop 150 is typically preferable in a more static temperature environment. The servo loop 150 method requires no thermistor readings or active mode overhead for oscillator calibration as in the case of table lookup calibration 130.

We claim:

1. A system for operating a battery operated communication device with reduced power consumption wherein the communication device is adapted to receive radio signals containing intermittently scheduled digital messages, the communication device comprising receiver means for frequency downconversion of said radio signals and demodulation of said digital messages;

a dual mode timer for continually maintaining system time while operating in one of two modes, said modes comprising an active mode and a sleep mode;

controller data processing means for data processing of the demodulated message data to extract the messages;

a reference oscillator for generating a reference clock, wherein the frequency of said reference clock is high enough to serve as clocking requirements for digital processing in the receiver and controller during the active mode, and wherein the frequency of said reference clock is responsive to input of an automatic frequency control word to the reference oscillator;

a sleep oscillator for generating a frequency which is low relative to the frequency of the reference clock and wherein power consumption of the sleep oscillator is very low relative to the power consumption of the reference oscillator; and controller means for supervising operation of the communication device, wherein said supervision is executed by a microprocessor operation with program memory contained in a storage register, the controller means including:

controller scheduling means for scheduling commands for supervision of the communication device, event scheduler means for receiving scheduling commands, the event scheduler means including registers for records of scheduled events, each scheduled event comprising a command word that initiates a processing event and the scheduled system time for execution of said command, the event scheduler continually monitoring system time for a match with the scheduled time in any of the records, said match causing execution of the command in the record for which the match occurs; and controller frequency tracking means for providing for automatic frequency control wherein received down-converted signals are processed to generate a frequency control word for the reference oscillator at the rate of once per message reception such that the frequency of the reference oscillator clock is frequency-locked to the received signal.

2. The system of claim 1, wherein one scheduled event comprises awakening the system from sleep mode.

3. The system of claim 1, wherein one scheduled event initiates operation of a state machine to execute a sequence of events.

4. The system of claim 3, wherein the sequence of events includes activating the reference oscillator.

5. The system of claim 1, further comprising a sleep mode calibration circuit that is operable to calibrate the dual mode timer for operation during sleep mode.

6. The system of claim 5, wherein the sleep mode calibration circuit is operable to determine a sleep mode timer calibration setting for the dual mode timer based upon a measured temperature prior to entering sleep mode.

7. The system of claim 5, wherein the sleep mode calibration circuit is operable to:

determine a plurality of sleep mode timer calibration settings, each respective to a corresponding temperature;

store the plurality of sleep mode timer calibration settings;

when the measured temperature compares favorably to a stored temperature, retrieve a corresponding sleep mode timer calibration setting; and apply the retrieved sleep mode timer calibration setting to the dual mode timer.

8. A battery operated communication device comprising a receiver that receives, down converts, and demodulates radio signals to produce demodulated message data;

a dual mode timer that continually maintains system time while operating in one of an active mode and a sleep mode;

a controller data processor that processes the demodulated message data to produce a digital message;

a reference oscillator that generates a reference clock having a frequency that is high enough to support clocking requirements for digital processing of the receiver and the controller data processor during the active mode, and wherein the frequency of the reference clock is responsive to an automatic frequency control that is input to the reference oscillator;

a sleep oscillator that generates a sleep clock having a frequency that is low relative to the frequency of the reference clock, wherein the sleep oscillator has power consumption that is very low relative to a power consumption of the reference oscillator; and a controller that supervises operation of the battery operated communication device and that includes:

a scheduler that schedules commands that supervise the battery operated communication device, an event scheduler that receives scheduling commands from the scheduler, the event scheduler including registers for records of scheduled events, each scheduled event comprising a command that initiates a processing event and a scheduled system time for execution of the command, the event scheduler continually monitoring system time for a match with the scheduled system time in any of the records, the match causing execution of the command of the record for which the match occurs; and a controller frequency tracker that provides the automatic frequency control to the reference oscillator based upon received downconverted signals at the rate of once per digital message reception such that the reference oscillator clock is frequency-locked to the received digital message.

9. The battery powered communication device of claim 8, wherein one scheduled event comprises awakening the battery powered communication device from sleep mode.

10. The battery powered communication device of claim 8, wherein one scheduled event initiates operation of a state machine to execute a sequence of events.

11. The battery powered communication device of claim 10, wherein the sequence of events includes activating the reference oscillator.

12. The battery powered communication device of claim 8, further comprising a sleep mode calibration circuit that is operable to calibrate the dual mode timer for operation during sleep mode.

13. The battery powered communication device of claim 12, wherein the sleep mode calibration circuit is operable to determine a sleep mode timer calibration setting for the dual mode timer based upon a measured temperature prior to entering sleep mode.

14. The battery powered communication device of claim 12, wherein the sleep mode calibration circuit is operable to:

determine a plurality of sleep mode timer calibration settings, each respective to a corresponding temperature;

store the plurality of sleep mode timer calibration settings;

when the measured temperature compares favorably to a stored temperature, retrieve a corresponding sleep mode timer calibration setting; and apply the retrieved sleep mode timer calibration setting to the dual mode timer.

* * * * *

UNITED STATES PATENT AND TRADEMARK OFFICE
CERTIFICATE OF CORRECTION

PATENT NO.       : 6,804,503 B2                                       Page 1 of 1
APPLICATION NO.  : 10/272439
DATED            : October 12, 2004
INVENTOR(S)      : Aki Shohara et al.

It is certified that error appears in the above-identified patent and that said Letters Patent is hereby corrected as shown below:

Column 21, line 30, in Claim 1: replace "comprising" with --comprising:--

Column 22, line 44, in Claim 8: replace "comprising" with --comprising:--

Signed and Sealed this

Twenty-ninth Day of July, 2008

JON W. DUDAS
*Director of the United States Patent and Trademark Office*